(12) United States Patent
Chatterjee et al.

(10) Patent No.: US 12,008,149 B2
(45) Date of Patent: Jun. 11, 2024

(54) METHOD AND SYSTEM FOR ON DEMAND CONTROL OF HARDWARE SUPPORT FOR SOFTWARE POINTER AUTHENTIFICATION IN A COMPUTING SYSTEM

(71) Applicant: International Business Machines Corporation, Armonk, NY (US)

(72) Inventors: Debapriya Chatterjee, Austin, TX (US); Brian W. Thompto, Austin, TX (US); Jose E. Moreira, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 17/123,944

(22) Filed: Dec. 16, 2020

(65) Prior Publication Data
US 2022/0188463 A1    Jun. 16, 2022

(51) Int. Cl.
*G06F 21/74*    (2013.01)
*G06F 9/30*    (2018.01)
(Continued)

(52) U.S. Cl.
CPC .......... *G06F 21/74* (2013.01); *G06F 9/30076* (2013.01); *G06F 9/30098* (2013.01);
(Continued)

(58) Field of Classification Search
CPC ........ G06F 21/54; G06F 21/74; G06F 9/3001; G06F 9/30032; G06F 9/30076;
(Continued)

(56) References Cited

U.S. PATENT DOCUMENTS

| 7,305,712 B2 * | 12/2007 | Watt | G06F 21/79 |
| | | | 712/E9.027 |
| 7,383,587 B2 * | 6/2008 | Watt | G06F 9/45558 |
| | | | 713/193 |

(Continued)

FOREIGN PATENT DOCUMENTS

| CN | 106529349 A | 3/2017 |
| GB | 2493124 A | 1/2013 |
| JP | 2005141160 A | 6/2005 |

OTHER PUBLICATIONS

Randall Hyde, "The Art of Assembly Language", Chapter 17—Interrupts, Traps and Exceptions, Sep. 30, 2012, 10 pages (Year: 2012).*

(Continued)

*Primary Examiner* — Sharon S Lynch
(74) *Attorney, Agent, or Firm* — Scully, Scott, Murphy & Presser, P.C.

(57) ABSTRACT

A computer system, processor, computer program product, and method for executing instructions in a software application that includes a processor that can be dynamically controlled, in response to a value set in a control register, to operate in either a secure mode or a performance mode. In the secure mode, the processor: upon encountering a secure mode entry instruction, computes an entry hash value using a hash function and stores the entry hash value; and upon encountering a secure mode exit instruction, computes an exit hash value, loads the entry hash value, and determines whether the entry hash value is the same as the exit hash value, and depending upon verification of the hash values can execute the return function or transfer control to the operating system. In the performance mode, the processor: executes both the secure mode entry instruction and the secure mode exit instruction as no-operations.

16 Claims, 5 Drawing Sheets

(51) Int. Cl.
*G06F 9/38* (2018.01)
*G06F 9/48* (2006.01)
*G06F 21/54* (2013.01)
*H04L 9/06* (2006.01)
*H04L 9/08* (2006.01)

(52) U.S. Cl.
CPC .......... *G06F 9/3818* (2013.01); *G06F 9/3836* (2013.01); *G06F 9/3867* (2013.01); *G06F 9/4812* (2013.01); *G06F 21/54* (2013.01); *H04L 9/0643* (2013.01); *H04L 9/0894* (2013.01)

(58) Field of Classification Search
CPC ............. G06F 9/30098; G06F 9/30101; G06F 9/30145; G06F 9/30189; G06F 9/3818; G06F 9/3836; G06F 9/3867; G06F 9/4812; H04L 9/0643; H04L 9/0894
See application file for complete search history.

(56) References Cited

U.S. PATENT DOCUMENTS

| | | | | |
|---|---|---|---|---|
| 7,603,551 | B2* | 10/2009 | McGrath | G06F 9/4403 713/164 |
| 7,752,459 | B2 | 7/2010 | Cowan et al. | |
| 8,571,993 | B2 | 10/2013 | Kocher et al. | |
| 8,775,824 | B2* | 7/2014 | Kershaw | G06F 21/53 713/193 |
| 9,177,147 | B2* | 11/2015 | Fischer | G06F 21/566 |
| 9,191,211 | B2* | 11/2015 | Melton | G06F 21/72 |
| 9,477,834 | B2* | 10/2016 | Grocutt | G06F 21/52 |
| 9,514,305 | B2 | 12/2016 | Acar et al. | |
| 9,891,918 | B2 | 2/2018 | Hooker et al. | |
| 9,898,351 | B2 | 2/2018 | Chaffin et al. | |
| 10,223,528 | B2* | 3/2019 | Kounavis | G06F 21/563 |
| 10,317,976 | B2 | 6/2019 | Schluessler et al. | |
| 10,333,965 | B2 | 6/2019 | Gathala et al. | |
| 10,838,878 | B2* | 11/2020 | Barnes | G06F 21/125 |
| 11,429,511 | B2* | 8/2022 | Dai | G06F 21/54 |
| 11,687,646 | B2* | 6/2023 | Pescatore | G06F 9/4484 726/23 |
| 2003/0033507 | A1* | 2/2003 | McGrath | G06F 9/30192 712/225 |
| 2004/0139346 | A1* | 7/2004 | Watt | G06F 9/45558 713/193 |
| 2004/0158727 | A1* | 8/2004 | Watt | G06F 21/79 713/193 |
| 2004/0210764 | A1* | 10/2004 | McGrath | G06F 9/4403 713/190 |
| 2007/0055872 | A1* | 3/2007 | Soga | G06F 21/74 713/168 |
| 2009/0172411 | A1* | 7/2009 | Kershaw | G06F 21/53 713/189 |
| 2009/0293130 | A1* | 11/2009 | Henry | G06F 21/74 726/26 |
| 2010/0220854 | A1* | 9/2010 | Melton | H04L 9/3236 380/37 |
| 2013/0205403 | A1* | 8/2013 | Grocutt | G06F 21/52 726/27 |
| 2014/0096245 | A1* | 4/2014 | Fischer | G06F 21/52 726/23 |
| 2018/0089422 | A1* | 3/2018 | Kounavis | G06F 21/563 |
| 2019/0026236 | A1* | 1/2019 | Barnes | G06F 9/3013 |
| 2019/0384693 | A1* | 12/2019 | Dai | G06F 11/3612 |
| 2020/0082066 | A1 | 3/2020 | Semeria et al. | |
| 2020/0082070 | A1 | 3/2020 | Semeria et al. | |
| 2020/0125501 | A1 | 4/2020 | Durham et al. | |

OTHER PUBLICATIONS

ARM1136JF-S and ARM1136JF-S Technical Reference Manual, Revision rlp5, p. 2-10, 2009 (Year: 2009).*
English Translation of CN104641347B (Obtained Feb. 1, 2024) (Year: 2024).*
International Search Report dated Jan. 24, 2022, received in a corresponding foreign application, 9 pages.
QUALCOMM. "Pointer Authentication on ARMv8.3: Design and Analysis of the New Software Security Instructions" whitepaper from Qualcomm https://www.qualcomm.com/media/documents/files/whitepaper-pointer-authentication-on-armv8-3.pdf. Jan. 2017. p 1-12.
SAFENET. "Hardware and Software Authentication: Choosing the Right Approach Decision Guide." Google.com, 2018, 7 pages.
Anonymous. "A Method of Verifying the Intended Recipient of Any Communication for Improved Security." IP.com; IPCOM000252449D. Jan. 12, 2018. 4 pages.
Anonymous. "Methodology and Procedure for Secure Granular Authorization and Audit Implementation in Distributed Enterprise Computing Environment." IP.com; IPCOM000237293D. Jun. 11, 2014. 18 pages.
Anonymous. "A Practical Code Signing Server for the Enterprise." IP.com; IPCOM000236621D. May 6, 2014. 11 bages.
Asokan, N. "Hardware-Assisted Run-Time Protection on Balancing Security and Deployability." Aalto University. 2017. 38 pages.
Liljestrand et al. "PAC it up: Towards Pointer Integrity using ARM Pointer Authentication." In 28th USENIX Security Symposium (USENIX Security 19) https://www.usenix.org/conference/usenixsecurity19/presentation/liljestrand. Aug. 14, 2019-Aug. 16, 2019. pp. 177-194.
Mashtizadeh et al. "CCFI: Cryptographically Enforced Control Flow Integrity." In Proceedings of the 22nd ACM SIGSAC Conference on Computer and Communications Security (CCS '15). Association for Computing Machinery, New York, NY, USA, DOI:https://doi.org/10.1145/2810103.2813676, 2015. 941-951.
Khalifa et al. "Memory Controller Architectures: A Comparative Study." Google , Research Gate. Dec. 2013. 7 bages.
Nuclei System Technology. "Dual-Mode Configurable RISC-V Processor IP." Google, 2017. 21 pages.
Anonymous. "Power-Saving Mode Control with Dynamically-Controlled Access." IP.com; IPCOM000239255D. Oct. 23, 2014. 5 pages.
Anonymous. " Dynamic, Adaptive Resolution for Performance Instrumentation." IP.com; IPCOM000237621D. Jun. 27, 2014. 5 pages.
Anonymous. "System and Method for Dynamic Identification of Refmon Check Necessity." IP.com; PCOM000234759D. Feb. 3, 2014. 4 pages.

* cited by examiner

```
0 | mflr      r0
1 | std       r0,offset1(r1)
2 | hashst    r0,offset2(r1)
3 | std       r31,offset3(r1)
```
- save LR (lines 0-1)
- compute and save hash (line 2)
- save GPR31 (line 3)

r1= stack pointer

Fig. 6

```
0 | ld        r0,offset1(r1)
1 | mtlr      r0
2 | hashchk   r0,offset2(r1)
3 | blr
```
- restore LR (lines 0-1)
- Restore+check+trap (line 2)
- return (line 3)

r1= stack pointer

Fig. 7

```
0 | mflr      r0
1 | std       r0,offset1(r1)
2 | nop
3 | std       r31,offset3(r1)
```
- save LR (lines 0-1)
- save GPR31 (line 3)

r1= stack pointer

Fig. 8

```
0 | ld        r0,offset1(r1)
1 | mtlr      r0
2 | nop
3 | blr
```
- restore LR (lines 0-1)
- return (line 3)

r1= stack pointer

Fig. 9

METHOD AND SYSTEM FOR ON DEMAND CONTROL OF HARDWARE SUPPORT FOR SOFTWARE POINTER AUTHENTIFICATION IN A COMPUTING SYSTEM

BACKGROUND

The present invention generally relates to information handling and data processing systems, processors, and memory systems, and more specifically to providing and controlling an increased security mode of operation for information handling systems, processors, and memory subsystems, for example, while running software applications.

With recent advancements in information technology and the wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

Modern computer systems typically contain several integrated circuits (ICs), including a processor which may be used to process information in the computer system. The information processed by a processor may include computer instructions that are executed by the processor as well as data, which is manipulated by the processor using the computer instructions. The computer instructions and data are typically stored in a main memory in the computer system.

Keeping unauthorized users and/or rogue software from accessing information handling and data processing systems is becoming increasingly important and difficult to achieve. In one situation, a user or software application may be authorized to have access to an information handling system, a processor, register files, and/or the memory subsystem, but may not be authorized to have complete access to the complete system, all the register files, or all of the memory subsystem. Accordingly, while the user or software application may be authorized to access portions of the system, the user and/or software application is not authorized to access the entire system, all the register files, and/or all the memory subsystem. In other situations, a user and/or software application is not authorized to access any portion of the computing system, the register files, and/or any portion of the memory subsystem. Protecting systems, register files, and/or memory subsystems from being accessed by an unauthorized user and/or software application can be difficult.

Application software stores code pointers such as function return addresses or data such as local variable values or pointer variables in a stack when calling a function. Malicious users can exploit code vulnerabilities such as buffer overflow, array access without bounds check, use after free, and other techniques to attack and overwrite the contents of the stack such that on return from a function, a code pointer or data value not intended by the software application is used. This can result in hijacking the control flow of a program since the return address is no longer the intended return target. This is sometimes referred to as Return Oriented Programming (ROP) attack. These techniques can also be used to manipulate software to access data values the software program was not meant to access and reveal secret information without affecting the control flow. This type of attack is sometimes referred to as Data Oriented Programming (DOP) attack. A class of solutions to overcome these security problems is to store a cryptographic signature. The signature is verified before making a reference to the pointer for control flow or data access. The level of security is provided by the cryptographic strength of the hash function used to compute the signature. Instructions to compute the hash value typically is provided by processor hardware. In one or more embodiments all the software is compiled with the additional instructions that compute the hash value (e.g., signature 1); store the hash value (signature 1) in the stack; and then before the pointer returns, load the hash value (signature 1) from memory; re-compute a hash value (e.g., signature 2); and check the recomputed hash value (signature 2) against the hash value (signature 1) loaded from memory. These operations consume time and are frequently done at each function call and pointer reference, and hence can cause significant performance overhead. That is, executing these additional instructions and performing the additional micro-operations can cause processor latency in running the application. This hash (signature) verification mechanism mainly provides application protection in situations where there are potential code vulnerabilities such as, for example, buffer overflow, which is exploited by a malicious user. It would be beneficial if the security mechanism, e.g., the computation and checking of the hash value (signature), could be run in environments where malicious attacks are a threat, but where the security mechanism, e.g., the hash verification technique, is not executed in a trusted environment so running the application does not incur the performance overhead.

SUMMARY

The summary of the disclosure is given to aid understanding of a computer system, computer architectural structure, processor, their methods of operation, and execution of software applications, including techniques of providing more secure methods of operation for such systems, processors, and software applications running on such systems and/or devices, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, their method of operation, and manner of executing software applications to achieve different effects.

Aspects of the present disclosure provide in one or more embodiments a system and/or method of processing data in a processor that includes: operating a processor, in response to a value set in a bit field of a control register, in either a secure mode or a performance mode, wherein in the secure mode, the processor upon encountering a secure mode entry instruction, computes an entry hash value using a hash function and one or more hash input parameters, and stores the entry hash value in a first memory location; and wherein in the performance mode, the processor upon encountering the secure mode entry instruction, executes the secure mode entry instruction as a no-operation. Preferably, the control register is set only at a privilege level above the privilege level at which the entry hash is computed. Optionally, in an aspect, the secure mode entry instruction is a single instruction that the processor, in response to operating in the secure mode, cracks into multiple instructions that compute the entry hash value and store the entry hash value. In a further optional aspect, the secure mode entry instruction is a single instruction that the processor, in response to operating in the performance mode, sends a no-op down an execution pipeline in the processor in place of the single secure mode entry instruction. The secure mode entry instruction in further aspects is a single instruction that the processor, in response to operating in the performance mode, performs at least one of the group consisting of: interprets as a no-operation; sends a no-operation instruction down the pipeline in place of the single secure mode entry instruction; skips over the single secure mode entry instructions, and combinations thereof. The secure mode entry instruction is inserted, preferably by a compiler, into application software code at a function call-up. Computing the entry hash value in an embodiment uses three hash input parameters, the three hash input parameters include a first hash input parameter that is a first value in a first general purpose register entry, a second hash input parameter that is a second value in a second general purpose register entry, and a third hash input parameter that is a secret key. Preferably, the secret key is stored in a special purpose register, and the special purpose register is accessible only in a privilege level higher than the privilege level computing the entry hash value.

The system and/or method in one or more embodiments further includes: wherein in the secure mode, the processor upon encountering a secure mode exit instruction, computes an exit hash value using the same hash used when computing the entry hash value, loads the entry hash value from the first memory location, and determines whether the entry hash value is the same as the exit hash value; and wherein in the performance mode, the processor upon encountering the secure mode exit instruction, executes the secure mode exit instruction as a no-operation. Optionally, the system and/or method further includes the processor, in response to operating in the secure mode and encountering the secure mode exit instruction, executing, in response to the entry hash value not being equal to the exit hash value, a trap interrupt, where in a preferred aspect the trap interrupt transfers control to an Operating System. In an embodiment, the secure mode exit instruction is a single instruction that the processor, in response to operating in the secure mode, cracks into multiple instructions that compute the exit hash value, load the entry hash value, and determine whether the exit hash value is the same as the exit hash value. Preferably, the secure mode exit instruction is a single instruction that the processor, in response to operating in the performance mode, performs at least one of the group consisting of: interprets as a no-operation; sends a no-operation instruction down the pipeline in place of the single secure mode exit instruction; skips over the single secure mode exit instruction, and combinations thereof. The secure mode exit instruction can be inserted into application software code, preferably by a compiler, at or before at least one of the group consisting of: function return, function exit; function completion; and combinations thereof.

A system and/or method for executing instructions in a software application are disclosed, where the system and/or method includes: a processor having circuitry and logic for executing the instructions, the processor comprising: a decode unit comprising circuitry and logic for decoding the instructions, the decode unit having a control register; an issue unit comprising circuitry and logic for receiving the decoded instructions and issuing decoded instructions, an execution unit comprising circuitry and logic for executing decoded instructions issued by the issue unit; and a non-transitory computer-readable medium having program instructions embodied therewith, the program instructions executable by the processor. The program instructions when executed by the processor, in one or more embodiments, cause the processor to: operate, in response to a value set in a bit field of the control register, in either a secure mode or a performance mode. In an embodiment, in the secure mode, the processor: upon encountering a secure mode entry instruction, computes an entry hash value using a hash function and stores the entry hash value in a first memory location; and upon encountering a secure mode exit instruction, computes an exit hash value using the same hash used when computing the entry hash value, loads the entry hash value from the first memory location, and determines whether the entry hash value is the same as the exit hash value, and in the performance mode, the processor: upon encountering the secure mode entry instruction, executes the secure mode entry instruction as a no-operation; and upon encountering the secure mode exit instruction, executes the secure mode exit instruction as a no-operation.

In an embodiment, the secure mode entry instruction is a single instruction and the secure mode exit instruction is a single instruction, the system further comprising programming instructions executable by the processor to cause the processor to: crack the single secure mode entry instruction, in response to operating in the secure mode, into multiple instructions that compute the entry hash value and store the entry hash value; and crack the single secure mode exit instruction, in response to operating in the secure mode, into multiple instructions that compute the exit hash value, load the entry hash value from memory, and determines whether the entry hash value is the same as the exit hash value. The system and/or method preferably further includes programming instructions executable by the processor to cause the processor to: in response to the entry hash value being equal to the exit hash value, perform a function return wherein the processor will exit the function; and in response to the entry hash value not being equal to the exit hash value, execute a trap interrupt that causes control to transfer to an Operating System.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, register files, their method of operation, and manner of executing software applications will be better understood when read in conjunction with the figures provided. Embodiments are provided in the figures for the purpose of illustrating aspects, features, and/or various embodiments of the computer system, computer architectural structure, processor, register files, and their method of operation including their manner of executing software applications, but the claims should not be limited to the precise arrangement, structures, assemblies, subassemblies, functional units, mechanisms, features, aspects, embodiments, devices, methods, processes, or techniques shown, and the arrangements, structures, assemblies, subassemblies, functional units, mechanisms, features, aspects, embodiments, devices, methods, processes, and techniques shown may be used singularly or in combination with other arrangements, structures, assemblies, subassemblies, functional units, mechanisms, features, aspects, embodiments, devices, methods, processes, and/or techniques.

FIG. 6 depicts a diagrammatic illustration of code for insertion into a software program to compute a cryptographic hash value according to an embodiment of the present disclosure.

FIG. 7 depicts a diagrammatic illustration of code for insertion into a software program to check a cryptographic hash value in accordance with an embodiment of the present disclosure.

FIG. 8 depicts a diagrammatic illustration of the operations performed during execution of the code of FIG. 6 inserted into a software program in response to the processor being set to a performance mode.

FIG. 9 depicts a diagrammatic illustration of the operations performed during execution of the code of FIG. 7 inserted into a software program in response to the processor being set to a performance mode.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, functional units, register files, memory subsystem, and their method of operation including their manner of executing software applications, however, it will be understood by those skilled in the art that different and numerous embodiments of the computer system, computer architectural structure, processor, functional units, register files, memory subsystem, and their method of operation including their manner of executing software applications may be practiced without those specific details, and the claims and invention should not be limited to the embodiments, assemblies, subassemblies, structures, arrangements, mechanisms, functional units, features, aspects, processes, methods, techniques or details specifically described and shown herein. Further, particular features, functional units, mechanisms, structures, arrangements, embodiments, aspects, and techniques described herein can be used in combination with other described features, functional units, mechanisms, structures, arrangements, embodiments, aspects, and techniques in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and the terms "comprises" and/or "comprising" when used specifies the presence of stated features, integers, steps, operations, elements and/or components, but do not preclude the presence or addition of one or more other features, integers, steps, operations, elements, components, and/or groups thereof.

The following discussion omits or only briefly describes conventional features of information processing systems, including processors (e.g., microprocessors), memory systems, and system architecture, and their method of operation including their manner of executing software applications, which are apparent to those skilled in the art. It is assumed that those skilled in the art are familiar with the general architecture of computer systems, memory systems, processors, register files, and their method of operation including their manner of executing software applications. It may be noted that a numbered element is numbered according to the figure in which the element is introduced, and is typically referred to by that number throughout succeeding figures.

Figure 1:
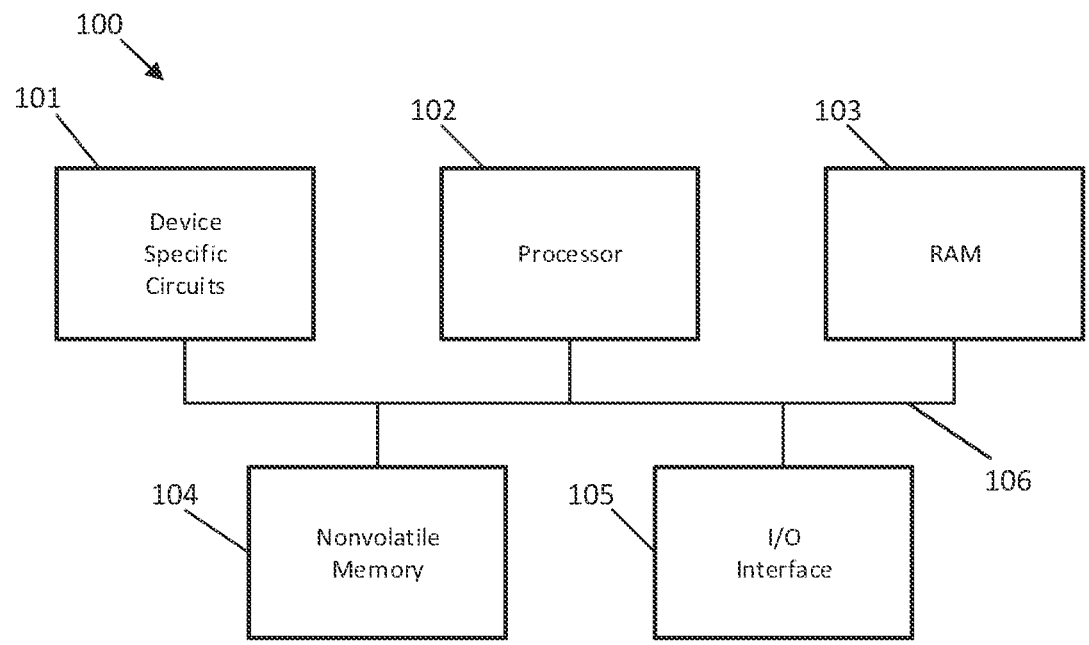
FIG. 1 depicts a general computing or data processing system in accordance with an embodiment of the present disclosure.

A computing or data processing system 100 suitable for use in the present disclosure may take many forms, one of which is shown in FIG. 1, where computing or data processing (information handling) system 100 is configured for storing and/or executing program code (e.g., software applications). In one embodiment, information handling system 100 may include at least one processor 102, which can be, or can be part of, a controller, coupled directly or indirectly to memory devices and input/output devices through a system bus 106, as shown in FIG. 1. Computing system 100 in FIG. 1 is shown with a processor 102 (also referred to a central processing unit (CPU) or microprocessor), Random Access Memory (RAM) 103, nonvolatile memory 104, device specific circuits 101, and I/O interface 105. Alternatively, or additionally, the RAM 103 and/or nonvolatile memory 104 may be contained in the processor 102 as could the device specific circuits 101 and 110 interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing digital instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data such as programming instructions and applications that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation Drive Interface (ADI).

Figure 2:
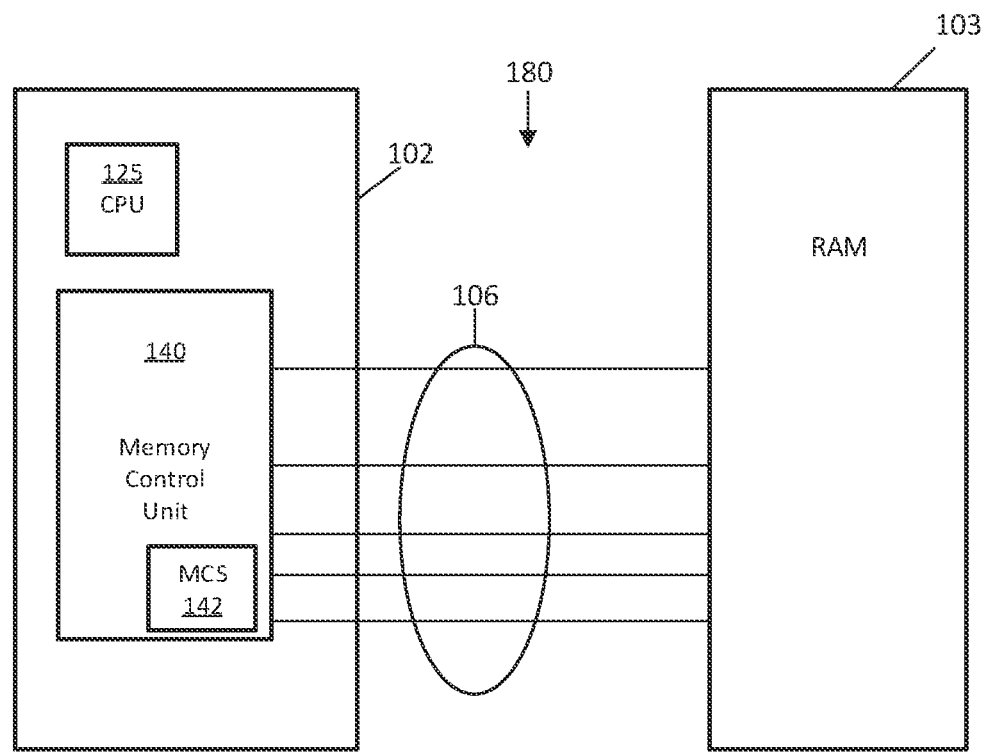
FIG. 2 depicts a processor and memory system according to an embodiment of the present disclosure.

FIG. 2 depicts an exemplary processing system 180 in which the present disclosure can be practiced that may be part of a larger computer system structure or network. The processing system 180 includes a control processor system or processor 102, which is a processing subsystem that includes at least one processor unit (CPU) 125 that may be configured to interface with a Memory Control Unit (MCU) 140. The CPU 125, also referred to as a micro-processor, may be a module that processes read, write, and configuration requests from a system controller (not depicted). The CPU 125 may be a multi-core processor. The MCU 140 may include a memory controller synchronous (MCS) 142, also referred to as a memory controller, that controls communication with one or more memory devices, e.g., DRAMs, (not shown in FIG. 2) in a memory subsystem 103. The MCU 140 and the MCS 142 may include one or more processing circuits, or processing may be performed by or in conjunction with the processor 125. The control processor system 102 communicates with the memory subsystem 103 through a communications bus 106.

Figure 3:
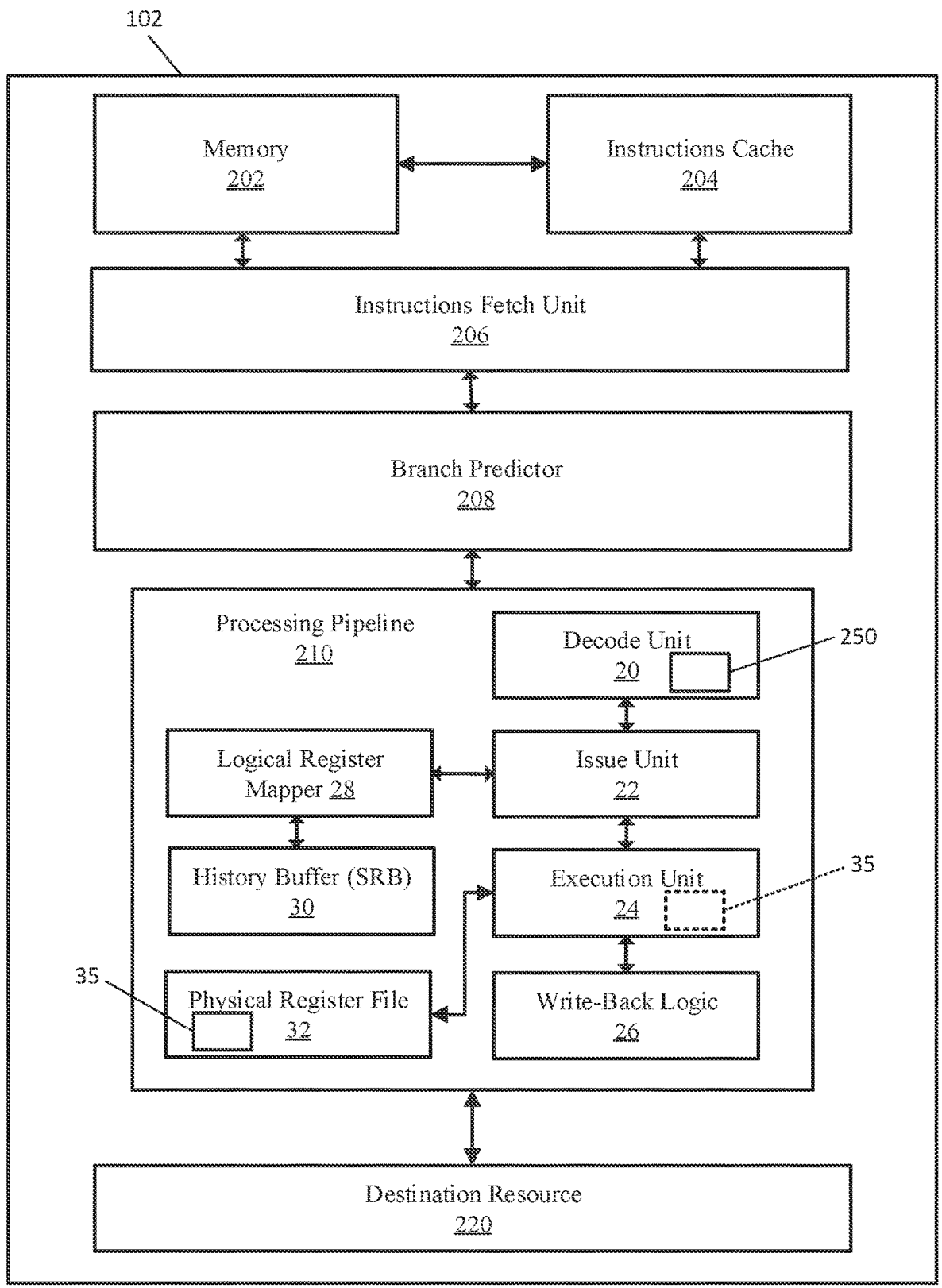
FIG. 3 depicts a block diagram of a processor in accordance with an embodiment of the present disclosure.

FIG. 3 depicts a block diagram of a processor 102 according to an embodiment in which the present disclosure can be practiced. The processor 102 may be a pipelined processor configured to execute one or more streams of instructions or threads. A thread (also referred to as an instruction stream) comprises a sequence or collection of instructions that together perform a specific task. The threads may be instruction streams from different parts of the same program executing on the processor, or may be from different programs executing on the processor, or combinations thereof. The processor in one embodiment may be a multithreaded processor and may process threads concurrently.

The processor 102, according to one embodiment, may include memory 202, an instruction cache 204, an instruction fetch unit 206, a branch predictor 208, a processing pipeline 210, and Destination Resource 220. The processor 102 may be included within a computer processor or otherwise distributed within a computer system. Instructions and data can be stored in memory 202, and the instruction cache 204 may access instructions in memory 202 and store the instructions, e.g., the instructions of the various threads, to be fetched in cache memory 204. Memory 202 may include any type of volatile or nonvolatile memory, such as cache memory. Memory 202 and instruction cache 204 can include multiple cache levels. A data cache (not shown) may also be included in the processor 102. The processor 102 preferably permits multiple threads to share the functional units of the processor 102 (e.g., instruction fetch and decode units, caches, branch prediction units, and execution units) preferably in concurrent fashion.

In FIG. 3, a simplified example of the instruction fetch unit 206 and the processing pipeline 210 are depicted. In various embodiments, the processor 102 may include one or more processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. The pipeline may also be broken down and illustrated differently. While a forward path through the processor 102 is shown in FIG. 3, other feedback and signaling paths may be included between elements of the processor 102. The processor 102 may include other circuits, functional units, and components.

The instruction fetch unit 206 fetches instructions from the instruction cache 204 for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The decode unit 20 may include one or more configuration registers 250, also referred to as control registers 250, discussed in more detail below. The issue unit 22 analyzes the instructions or other data and transmits the decoded instructions, portions of instructions, or other data to execution unit 24 in the pipeline 210 based on the analysis. The execution unit 24 performs and executes operations specified by the instructions issued to the execution unit 24. The execution unit 24 can include a plurality of execution units, such as, for example, fixed-point execution units, floating-point execution units, load/store execution units, vector scalar execution units, and/or other execution units. The physical register file 32 holds data for the execution units 24.

Computing systems, processors, and digital logic systems often includes registers that may be read or written from software programs. Modern integrated circuit-based registers are usually implemented using static random access memory (SRAM) with multiple ports. Registers generally have dedicated read and write ports. Registers can be, for example, data registers, address registers, general purpose registers, status registers, special purpose (SPR) registers, and configuration (control) registers. In an aspect, a register is a real or virtual data storage location that in an embodiment has an address in the memory map. In an example, a register file can be an array of processor registers in a processor (CPU). Some of these registers, or portions of the registers, e.g., register entries, are configuration or control registers.

The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located. When a mispredicted branch instruction or other exception is detected, instructions and data subsequent to the mispredicted branch or exception are discarded, e.g., flushed from the various units of processor 110, including logical register mapper 28. A history buffer, e.g., Save & Restore Buffer (SRB) 30, contains both speculative and architected register states and backs up the logical register file data when a new instruction is dispatched. In this regard, the history buffer 30 stores information from the logical register mapper 28 when a new instruction evicts data from the logical register mapper 28 in case the new instruction is flushed and the old data needs to be recovered. The history buffer (SRB) 30 keeps the stored information until the new instruction completes. The history buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 102 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 3 for the sake of simplicity of understanding, and further details as relevant will be provided below.

In certain aspects, a processor 102 may have multiple execution/processing slices with each slice having one or more of the units shown in FIG. 3. For example, each processing slice may have its own processing pipeline 210 with functional/execution units 24. A processor 102 having multiple processing slices may be capable of executing multiple instructions simultaneously, for example, one instruction in each processing slice simultaneously in one processing cycle. Such a processor having multiple processing slices may be referred to as a multi-slice processor or a parallel-slice processor. Simultaneous processing in multiple slices may considerably increase processing speed. In single-thread (ST) mode a single thread is processed, and in SMT mode multiple threads are processed, e.g., in one or more embodiments two threads (SMT2) or four threads (SMT4) are simultaneously processed.

Information handling and data processing systems, computer systems, processors, and/or digital logic systems are vulnerable to attack, for example, by Return Oriented programming (ROP) attacks, which can result in hijacking control over the flow of a program. It would be advantageous and beneficial to provide systems and techniques to provide better security against these and other attacks. In one or more embodiments, a more secure system, processor, and technique includes storing a cryptographic signature of, for example, a stack pointer. The cryptographic signature in one or more embodiments is verified before making reference to the stack pointer for control over the program flow or data access. The cryptographic signature in one or more embodiments is a hash of one or more parameters. The level of security typically is provided by and based upon the cryptographic strength of the hash function used to compute the signature. The processor is provided with support, e.g., circuits, logic, firmware, etc., to support computing and verifying the hash values (the signatures), and the compiler will insert instructions to perform those operations at appropriate places in the software application code, and thus protect the application code from attack.

Under some circumstances it may be preferable for the processor to operate at the more secure mode which includes computing the cryptographic signature, e.g., the hash value, storing the signature (e.g., the hash value) and verifying the signature (e.g., the hash value) before making reference to the pointer for control over the program flow or data access. In an embodiment, to operate in the more secure mode utilizing the cryptographic signature mechanism, all software with the additional instructions to compute the hash value (e.g., signature 1), store the hash value (signature 1) in the stack, and then before using the pointer, load the hash value (signature 1) from memory, re-compute a hash value (signature 2), and check the recomputed hash (signature 2) against the hash value (signature 1) loaded from memory would be compiled and executed. These additional operations to compute and check the hash are frequently done at each function call and pointer reference, and hence can result in significant performance overhead, e.g., can hinder the performance of the processor executing the software application.

It would be beneficial if the processor could execute software applications in trusted environments without undergoing these extra hash (signature) verification operations, e.g., operate at a higher performance level, e.g., a performance mode, and in other circumstances it may be preferable for the processor to operate at a higher security level, e.g., secure mode, where the hash (signature) verifications can be performed to resist malicious attacks. However, this would require two versions of all applications and a library (1) which has been instrumented with the additional instructions inserted to provide the secure operations, and (2) uninstrumented code without the additional instructions inserted to perform the extra operations (e.g., does not compute the hash or check the hash), and would also require the ability to choose between the two code versions at the time of execution. Having a library with two different versions of code would require additional storage and additional challenges at runtime to select between the two versions of the code. It would be preferable and beneficial if the mode under which the processor operates could be controlled so that the processor can switch between performance mode or secure mode during processor operation without the overhead of storing two different code versions and choosing between the two different versions of code at runtime.

Existing hardware support solutions for hash-based pointer authentication do not provide dynamic control over these instructions on demand. Code that has been compiled with instructions to perform the additional security operations always compute the additional instructions incurring the increased overhead. In one or more embodiments, the additional operations for the secure mode of operation, e.g. to compute and store the hash, can be combined under a single instruction and then whether that single instruction performs those operations or behaves as a no-op (no operation) which does not consume any additional execution time or resources can be chosen, preferably dynamically chosen. Accordingly, the same code can be run with a dynamic choice of including the additional security mechanism or instead be run in a higher performance mode that does not execute the additional security mechanism, e.g., does not execute some or any of the additional instructions.

In one or more embodiments, a new single instruction is introduced to both compute and store the hash at function call-up, and in an embodiment the new instruction is referred to as "hashst", but other terminology is contemplated for the new instruction. The new single instruction in an embodiment is defined to both compute a cryptographic hash (e.g., cryptographic signature 1) and to store the hash (signature 1) in memory. In one or more embodiments, another new single instruction is introduced to both load the hash (signature 1) from memory and to check the hash (signature 1) loaded from memory against a recomputed hash (signature 2) at function return, and in an embodiment the new instruction is referred to as "hashchk", but other terminology is contemplated for the new instruction. The new single instruction "hashchk" in an embodiment loads the hash value (signature 1) from memory (that was previously computed and stored in memory) and checks the hash value (signature 1) loaded from memory against a recomputed hash value (signature 2). A control register in an embodiment is defined that can enforce the processor to interpret and perform these new instructions ("hashst" or "hashchk") as they are defined, or treat them as no-operations, also referred to as "no-ops" or "nops", that are not performed. In an aspect, a bit field in the control register is set which informs the processor to interpret and perform the instruction as provided in the code or to interpret the instruction as a no-op, and/or ignore the new instructions. This approach associates all the additional overhead with respect to the additional security check to be associated with two instructions (e.g., "hashst" and "hashchk"), and permits treating the two instructions as no-ops to eliminate almost all the additional overhead. This approach provides a manner of turning off the security mechanism, e.g., the hash computation and hash checking, on instrumented code that offers close to the same performance as non-instrumented code.

Typically, to provide a more secure processor and/or more secure execution of application code on a processor, a cryptographic hash instruction computes a cryptographic hash (signature 1) of a stack pointer and a store instruction has the cryptographic hash value (signature 1) stored in memory. Generally any hash function of choice that has the required input, output, and key width can be used. The hash function can also incorporate any number of parameters. That is, any number of different ways of computing the hash, and any number of different hash functions can be utilized. In an example, the hash computation can be relatively simple, for example a hash computation of a single parameter. For example, the hash can be computed and represented by RT<=H(RA), where H(RA) computes a cryptographic hash of one parameter from register RA and outputs the results to register RT. The hash value (sometimes referred to as the signature) is generally stored in memory using a store instruction.

The level of security is a function of the strength of the hash computation. In this regard, a more complex hash using multiple parameters can provide a more secure hash. In a specific example, a more secure hash can be computed using multiple parameters, such as for example, RT<=H(RA, RB, RC) which computes a cryptographic hash (signature) of three parameters. In an example RA and RB can be values retrieved from general purpose registers (GPRs) of any bit width, but preferably double word width (64-bits), and RC in an aspect can be a key. The key in an embodiment can be of any bit width but preferably of double word width (64-bits). In an aspect as an additional measure of security the key can be a secret key that is hidden. The hash computation acts as a signature that in an embodiment needs to be authenticated and makes it more difficult to attack the processor and take over control of the program flow or data access.

In an embodiment, as an additional measure of security, the key (for example the secret key) is stored in a special purpose register (SPR) with restricted access, and in an aspect is stored in a special purpose register (SPR) that is only accessible in the privilege level above the privilege level executing the compute hash instruction. In an embodiment, the SPR holding the key is only accessible in supervisor mode. The secret key in an aspect is preferably set by a supervisor, e.g., in a supervisor level of operation. In this regard, regular applications, such as for example, email client, browsers, etc., run in a privilege state know as user mode or problem state, and the operating system executes on the processor in a higher privilege state known as supervisor privilege state. The SPR holding the secret key in an aspect could only be directly read or written to in supervisor privilege state, and can result in an access exception when attempted to be read/written directly in user mode/problem state. In other words, the secret key is not directly accessible in the privilege level executing the instruction to compute the secret hash.

The special purpose register (SPR) for storing the secret key, in an embodiment, is a per hardware thread register, and in an aspect a special purpose register (SPR) 35 holding the secret key is located in the Physical Register File 32 associated with Execution Unit 24 of the processor 102 shown in FIG. 3, but it is contemplated that the special purpose register (SPR) 35 holding the secret key can be located in other locations in the processor. For example, the Physical Register File 32 with special purpose register (SPR) 35 could reside within the Execution Unit 24, or a separate special purpose register (SPR) 35 could be located in the Execution Unit 24 as shown by dashed lines in FIG. 3.

In one or more embodiments a single instruction (e.g., "hashst") can be inserted into the code and at function entry is executed to compute the hash (signature 1) and store the results (e.g., the hash value/signature 1) to memory. The processor typically is provided support, e.g., circuits, logic, and firmware, to support the compute hash function, and the compiler will insert the instruction(s) in appropriate places and thus protect the application code from attack. In one or more embodiments, the single instruction (e.g., "hashst") to compute the hash value (signature 1) and store the hash value (signature 1) to memory will be inserted by the complier into appropriate places in the code, for example upon or prior to entering a function (at a function call). During operations, in an embodiment, the processor at function call-up (e.g., at function entry) the processor will crack the single instruction into a compute the hash instruction and store ("st") the hash value (signature) into memory instruction.

In one or more embodiments, instructions to load ("ld") or restore the hash value (signature 1) from memory, to recompute a hash value (signature 2), and check the recomputed hash value (signature 2) against the hash value (signature 1) loaded from memory is performed at function return, e.g., upon or just prior to exiting a function. That is, the hash value (signature 2) is recomputed using the same hash function and checked against the hash value (signature 1) that was computed at function call-up (e.g., at function entry) and stored in memory. In one or more embodiments, a trap interrupt, also referred to as a trap exception, is generated when checking the hash to transfer control from the application to system software if there is a mismatch between the hash (signature 1) restored from memory and the recomputed hash (signature 2), which provides greater software control. The trap exception or trap interrupt is a type of exception generated in the processor when a user mode instruction runs into an error condition (in this case a mismatch of stored v. recomputed hash), which transfers control over to the supervisor state. The optional trap exception in an embodiment moves/transfers program control to the supervisor state so that the return instruction does not execute providing better control tan waiting for a fault to occur if the signatures (hashes) do not match. Hash check instructions can be provided that upon a mismatch of the hash stored in memory and the recomputed hash, the application can transfer control to the operating system and/or exit the application that is running so that the function return instruction is not executed. In this manner, the pointer should not direct the application to an unintended target and control is not provided to a potential attacker.

In one or more embodiments, a single check hash instruction (e.g., "hashchk") can be inserted into the code and executed at function exit where the check hash instruction ("hashchk") loads the hash value (signature 1) previously computed from memory, recomputes a hash value (signature 2) using the same hash function, and checks the recomputed hash (signature 2) against the hash value (signature 1) from memory. In an embodiment, that single instruction (e.g., "hashchk") that loads the hash from memory and checks a recomputed hash can also include execute a trap interrupt or trap execution that exits the application and/or transfers control to the operating system if there is a mismatch between the recomputed hash and the hash from memory.

The processor typically is provided support, e.g., circuits, logic, firmware, etc., to support the check hash function, and the compiler will insert the single instruction (e.g., "hashchk") in appropriate places and thus protect the application code from attack. In one or more embodiments, the single instruction ("hashchk") that loads the hash from memory and checks a recomputed hash with the hash restored from memory will be inserted by the complier into appropriate places in the code, for example, upon encountering a function return instruction (e.g., upon or prior to exiting a function). During operations, in an embodiment, the processor upon encountering the "hashchk" instruction, will crack the single instruction ("hashchk") into a load ("ld") instruction which loads the hash value (signature 1) from memory, and a check hash value instruction which checks the hash value (signature 1) loaded from memory against the recomputed hash value (signature 2) executed at function exit. In one or more embodiments, the processor upon or prior to function exit, encounters the single instruction ("hashchk"), and optionally further performs a trap interrupt if the recomputed hash and the hash from memory do not match. The trap interrupt in one or more embodiments transfers control to the operating system and/or prevents the function return instruction from being executed.

In one or more embodiments, one or more configuration registers can be used to provide dynamic control of a processor running an application, and more specifically dynamic control over a more secure mode of operation or a more performance oriented mode of operation where in the secure mode of operation the processor will use a security mechanism (e.g., utilize hash checking) to protect the processor while running a software application and in the performance mode of operation the processor will not use the security mechanism, and in an embodiment will instead perform a no-op in place of the secure mechanism instructions (e.g., the "hashst" and "hashchk" instructions). The secure mechanism in one or more embodiments includes (i) and instruction to generate and store a hash value (signature 1), and/or (ii) an instruction to load and check the recomputed hash value (signature 2) against the hash value from memory (signature 1), and optionally perform a trap exception or trap interrupt.

The configuration or control register that is utilized to provide dynamic control of the mode of operation of the processor, e.g., secure or performance mode, typically is located in the processor and in one or more embodiments is located in the decode unit of a processor, as shown by configuration/control register 250 in FIG. 3, although the configuration/control register can be located in other locations. In the instruction fetch unit of the processor, in an embodiment, a conditional decode logic would be implemented which depending on the value in the configuration register (e.g., configuration or control register 250) would interpret the instruction to compute and store the hash, and the instruction to check the hash as described above and send the micro-operations down the pipeline for processing, or (ii) would interpret the instruction to compute and store the hash value instruction, and the instruction to check the hash as a no operation (no-op) and send the no-op instruction down the pipeline of the processor. In an aspect, the value in the configuration register is set by a privilege level above the instruction being executed, e.g., the supervisor privilege level.

One or more embodiments of the disclosure will be described with more detail, but it should be recognized that the invention should not be limited to these details unless explicitly set forth in the language of the claims. The single instruction to compute the hash (signature 1), preferably a secret hash, and store the hash (signature 1) in memory, in an embodiment will take the form of "hashst", although other terms are contemplated as the single instruction to perform both the hash compute and hash store functions. The hash function in one or more embodiments is not limited and the parameters used to generate the hash in one or more embodiments are also not limited. In a special application, the hash that is generated is a function of three parameters, which performs the following function: RT<=H(RA, RB, <secret>), where RT, RA, RB are all general purpose registers, preferably 64-bit general purpose registers, and <secret> is a secret key, preferably a 64-bit key specified by a special purpose register (SPR) not directly accessible in the privilege level executing the hash by move-to (mtlr) or move-from (mflr) special register (SPR) instructions, but accessible in the privilege levels above it. Upon encountering a function call-up the instruction "hashst" is inserted into the software application code. In response to running the software application code, and further in response to the control register being set for secure mode, upon encountering the "hashst" instruction, the "hashst" instruction, in an embodiment, is cracked into two instructions ("hashgen" and "st") which perform the following micro-operations:

hashgen RT, RA, RB [temp<=hash function (RA, RB, secret key)]

store ("st") RT, D(RA) [Memory [RA+D]<=temp]

Upon encountering a function return instruction, e.g. a function exit, the instruction "hashchk" is inserted into the software application code. In response to running the software application, and in further response to the control register being set for secure mode, a hash has to be recomputed (signature 2) and checked against the hash (signature 1) previously computed and saved to memory upon (or prior to) function entry. In other words, the signatures (hash values) have to be authenticated so that the software pointer is verified to be accurate and is pointing at the intended target. Accordingly, upon encountering the "hashchk" instruction where the processor is operating in secure mode (e.g., the control register is set for secure mode), the two hash values (signature 1 and signature 2) should be checked to determine if they match, because if they do not match then the application/processor might be subject to an attack.

In one or more embodiments, while running a software application, and operating in a secure mode (e.g., control register set to secure mode), a number of micro-operations are performed, including, in an embodiment, loading the hash value (signature 1) from memory, recomputing a hash value (signature 2), and checking the hash values (signature 1 and signature 2) for a mismatch. That is, upon encountering the "hashchk" instruction while running software application code in a secure mode/configuration, the processor in an embodiment cracks the "hashchk" instructions into a number of instructions that perform each of the following micro-operations, loading the hash from memory, recomputing the hash, and checking the hash:

load R1, D(RA)
hashgen RT, RA, RB
cmp R1, RT [compare to determine if register values are different]

where "load" R1, D(RA) refers to loading into register R1 the previously calculated value of the hash (signature 1) at function entry that was stored in memory, "hashgen" refers to recalculating the hash (signature 2) at function exit, and "cmp" refers to comparing the hash value (signatures 1) loaded into R1 from memory against the current generated hash output (signature 2) to see if the values are the same.

In an embodiment, the single "hashchk" instruction can also include a trap interrupt, where if the values in the two registers are not the same, then rather than waiting for a fault if the values do not match, control is transferred to the operating system. The trap interrupt in a further embodiment includes exiting the software application code that was running, and in an aspect not performing the function return. Other trap interrupts are contemplated that could be instituted to avoid the attack or to further check the discrepancy (the mismatched signatures). The single "hashchk" instruction can be used to perform the load, hash recomputation, hash check, and trap micro-operations as follows:

ld R1, D(RA)—load hash value (signature 1) from memory
hashgen RT, RA, RB—recompute/generate hash value (signature 2)
tdne R1, RT—compare hash from memory (signature 1) to recomputed hash value (signature 2) and trap the application if the two hash values (signature 1 and signature 2) do not match.

The processor is provided with circuits, logic, functional units (e.g., special purpose register for secret key, configuration register), firmware, etc., to support the new ("hashst") instruction to compute the hash and store the hash micro-operations, and to support the new ("hashchk") instruction, e.g., to perform the load the hash from memory, re-compute the hash, check the hash, and optionally the trap interrupt micro-operations, and the compiler will insert the new instructions in appropriate places and thus protect the application code from attack.

To control whether the processor performs the security mechanism, e.g., the hash verification technique upon entering and exiting a function, a control register is provided in the processor, preferably in the decode unit. Depending on the value in the control register, which in an embodiment is set by a privilege level above the privilege level in which the hash verification instructions are executed, register conditional decode logic would be implemented to interpret the instruction(s) as defined and send the micro-operations to the downstream pipeline of the processor, or interpret the instruction(s) as no operations (no-ops) where a no-op is sent to the downstream pipeline of the processor and the instruction(s) are not performed or executed. For example, if the bit is set in the configuration register (e.g., set to a "1" or high), then the processor can operate in a secure mode where the hash verification instructions will be executed, and if the bit is not set in the configuration register (e.g., set to a "0" or low), then the processor can operate in a performance mode where the hash verification instructions will not be executed and running the application will not incur the overhead of processing the additional micro-operations associated with the hash verification instructions. Setting the bit in the control register provides dynamic control of whether the processor when running an application will undergo the extra instructions associated with the hash verification techniques, or will not incur the extra overhead and will not execute the extra instructions associated with the hash verification technique.

Figure 4:
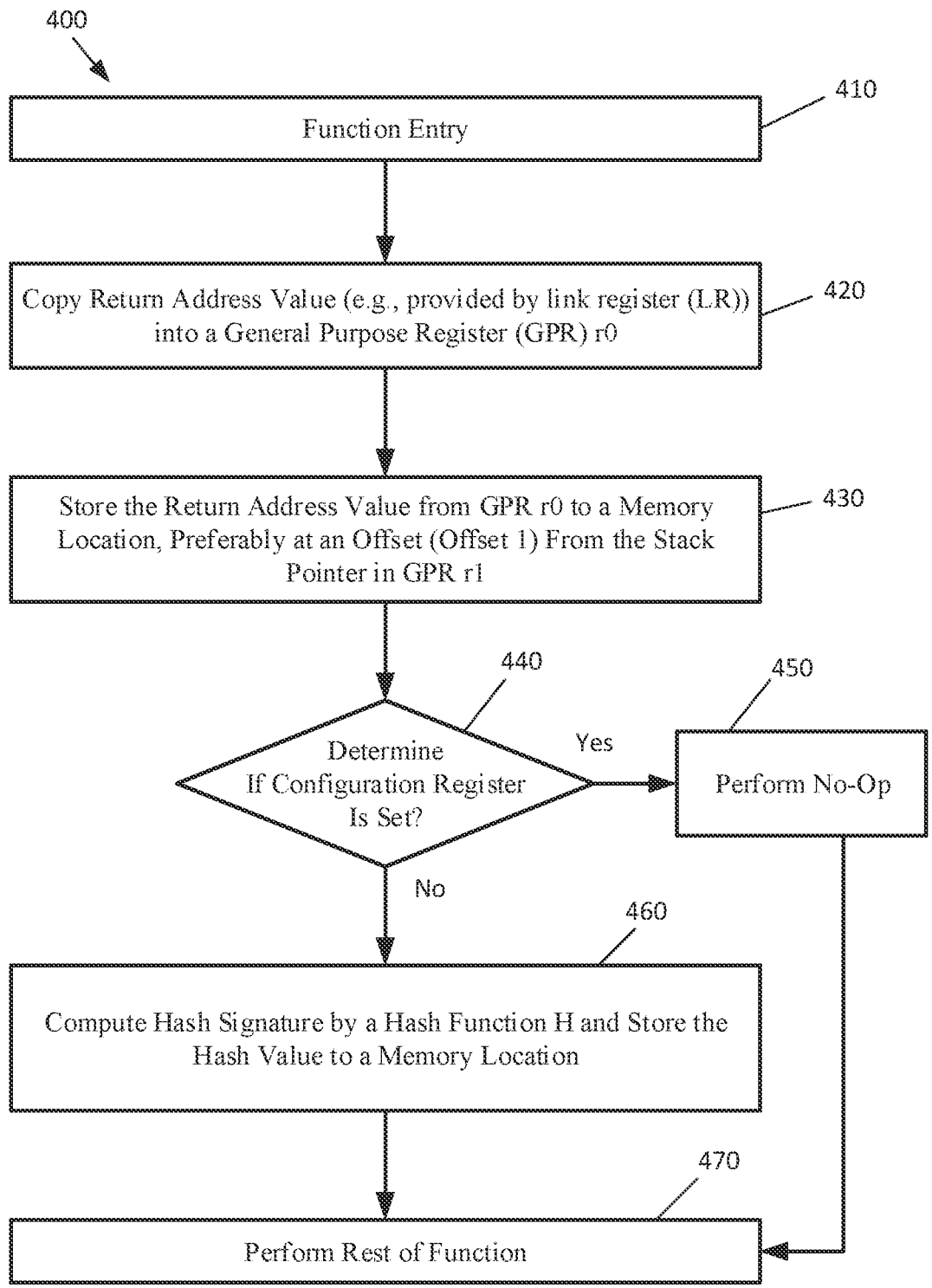
FIG. 4 depicts a flow chart of a method, according to an embodiment, of controlling a secure mode of operation of a processor while running a software program/application on a processor.

FIG. 4 illustrates an embodiment of a method 400 of undergoing a process to dynamically control whether a processor operates in a secure mode or a performance mode, where the secure mode in an aspect utilizes a security mechanism for authenticating the operations of the processor to make the processor more resistant to attack while running a software application. The method 400 in a preferred embodiment is more specifically directed to controlling whether to undergo instructions to compute and utilize a cryptographic signature to make a processor more secure, particularly while operating a software application. While method 400 shown in FIG. 4 is described for the sake of convenience and not with an intent of limiting the disclosure as comprising a series of steps and/or number of steps, it is to be understood that the process does not need to be performed as a series of steps and/or the steps do not need to be performed in the order shown and described with respect to FIG. 4, but the process may be integrated and/or one or more steps may be performed together, simultaneously, or the steps may be performed in the order disclosed or in an alternative order, unless indicated otherwise.

The method 400 of controlling whether a processor executing a software application operates in a more secure mode that utilizes a security mechanism, e.g., that makes the processor more resistant to attempts to control program flow and/or obtain unauthorized data access, or a performance mode that does not utilize the security mechanism, includes in one or more embodiments inserting applicable instructions while compiling the software application at appropriate locations in the software application code, e.g., at function call-up. In an example a single instruction, e.g., "hashst", is inserted into the code at function call-up, which as described, in an aspect, when executed by the processor, has the processor perform micro-operations that both (i) compute a hash value (signature) that is a hash function of one or more parameters, and (ii) store the hash value (signature), e.g., the result of the hash computation, in memory.

The method 400 in an embodiment further includes inserting applicable instructions while compiling the software application at function return. In a further example, a single instruction, e.g., "hashchk", is inserted into the code at function return, which as described, in an aspect when executed by the processor, the processor performs micro-operations that (i) re-computes a hash value (signature 2), (ii) loads the hash value (signature 1) from memory, and (iii) compares the re-computed hash (signature 2) with the hash restored (loaded) from memory (signature 1). In an optional embodiment, the single instruction inserted at function return, e.g., "hashchk", includes further performing a trap interrupt.

Method 400 at 410 encounters a function call up, e.g., undergoes a function entry. In an example, while running a software application, at 410, a function call (also referred to as function prologue) is encountered. At 420, upon function entry, a return address value is copied into a general purpose register, for example into GPR r0. In an aspect, the return address that is copied is provided by a link register (LR). In an aspect, the general purpose register, e.g., GPR r0, is a sixty-four (64) bit GPR, although other sizes are contemplated. At 430 the return address value from the general purpose register GPR r0 is stored to a memory location. That is, the value from GPR r0 in the example is moved to a memory location. In one or more embodiments, the value from GPR r0 is stored to memory preferably at an offset (e.g., offset 1) from the stack pointer in general purpose register GPR r1. For example, the offset can be a negative or positive offset from the stack pointer in GPR r1.

At 440 it is determined whether or not the processor is configured to operate in a secure mode or in a performance mode. In one or more embodiments, to determine whether the processor is configured in a secure mode or a performance mode, a control register (e.g., a configuration register) is checked, and in a particular embodiment a bit field in the control register is checked. In an aspect, if the bit field in the control register is set to a "1" or high, the processor is set to operate in a secure mode, and if the bit field is set to "0" or low the processor is set to operate in a performance mode. Alternatively, the control register and processor can be configured so that a "1" or high in the control register field will set the processor to operate in a performance mode, while a "0" or low value will set the processor to operate in a secure mode. In one or more embodiments, the control register is set to determine the mode of operation of the processor, and in an embodiment the control register is accessible and only settable in a privilege level above the privilege level that the processor executes 410, 420, and/or 430, and in a further aspect is only settable in a privilege level above the privilege level that computes the hash at 450. That is, in an embodiment, the control register can only be set at a privilege level above the privilege level at which the software is running on the processor, and in an aspect can only be set at a supervisor level.

If the control register (e.g., the processor) is set to operate in performance mode, e.g., the processor is set to not operate in a secure mode (440: No), then in an embodiment a no-op is performed (a no-operation is set down the processor pipeline) and the method 400 continues to 470 where the function is performed, but not the computation and storage of a hash value. In one or more embodiments, process 400 includes at 450, in response to the processor being set to a performance mode, interpreting the "hashst" instruction as a no-op and sending the no-op instruction down the pipeline so that the processor does not compute and store the hash, but instead performs no-operation in response to the "hashst" instruction, and in an aspect skips the "hashst" instruction and continues to 470 where the function is performed.

In an embodiment, checking whether the processor is set for a secure mode or a performance mode at 440 is optional, and in one or more embodiments the process 400 can proceed directly to 450 without checking the control register, or can check the control register and proceed to 450 regardless of whether the processor is set for secure mode or performance mode. In other words, in one or more embodiments, the processor can execute the security mechanism, e.g., execute the "hashst" instruction as described below, regardless of the control register setting.

If the control register is set for a secure mode, e.g., the processor is set to not operate in a performance mode (440: Yes), then the processor proceeds to 460 where a hash (e.g., a signature) is computed using a hash function H and the result is stored into memory. In one or more embodiments, the processor encounters the "hashst" instruction and executes the "hashst" instruction to compute and store a hash value (signature) in memory. In an aspect, upon encountering the "hashst" instruction, the processor cracks the instruction into micro-operations that include computing the hash (e.g., a "hashgen instruction) and storing the hash value in memory (e.g., a "st" instruction). The hash computation can include a number of inputs or parameters, and in an embodiment includes three parameters or inputs. In an embodiment the three inputs or parameters for the hash computation are values in GPR r0, GPR r1, and a special purpose register (SPR). The value in the special purpose register (SPR) in an embodiment is a secret key, and the SPR in an aspect is referred to as "HASHKEYR". The value in special purpose register HASHKEYR in an embodiment is only accessible from a privilege level higher than the execution of the software application, e.g., the hash computation. The results or output of the hash computation in an embodiment are produced in a first temporary register (tmp1), and in a preferred embodiment the result is sixty-four (64) bits. The output to first temporary register (tmp1) can in a specific preferred embodiment be represented by tmp1=H(GPR r0, GPR r1, HASHKEYR). The hash function H can be any number of hash functions and the method is not limited by the hash function H selected or used. In an embodiment a pre-defined hash function is used.

In one or more embodiments, at 460, the hash value output to a first temporary register (tmp1) is also stored to a memory location, and in an embodiment is stored at another offset (offset 2) from the stack pointer in GPR r1. At 470, the rest of the function entered at 410 is performed. The processing of the function is performed at 470 and in response to the function being completed, e.g., upon encountering a function return instruction (where the program is to exit the function (e.g., at function exit)) further processing is performed in an embodiment to check the hash signature performed at function entry (e.g., at function call-up) to a recomputed hash performed at function return/exit.

Figure 5:
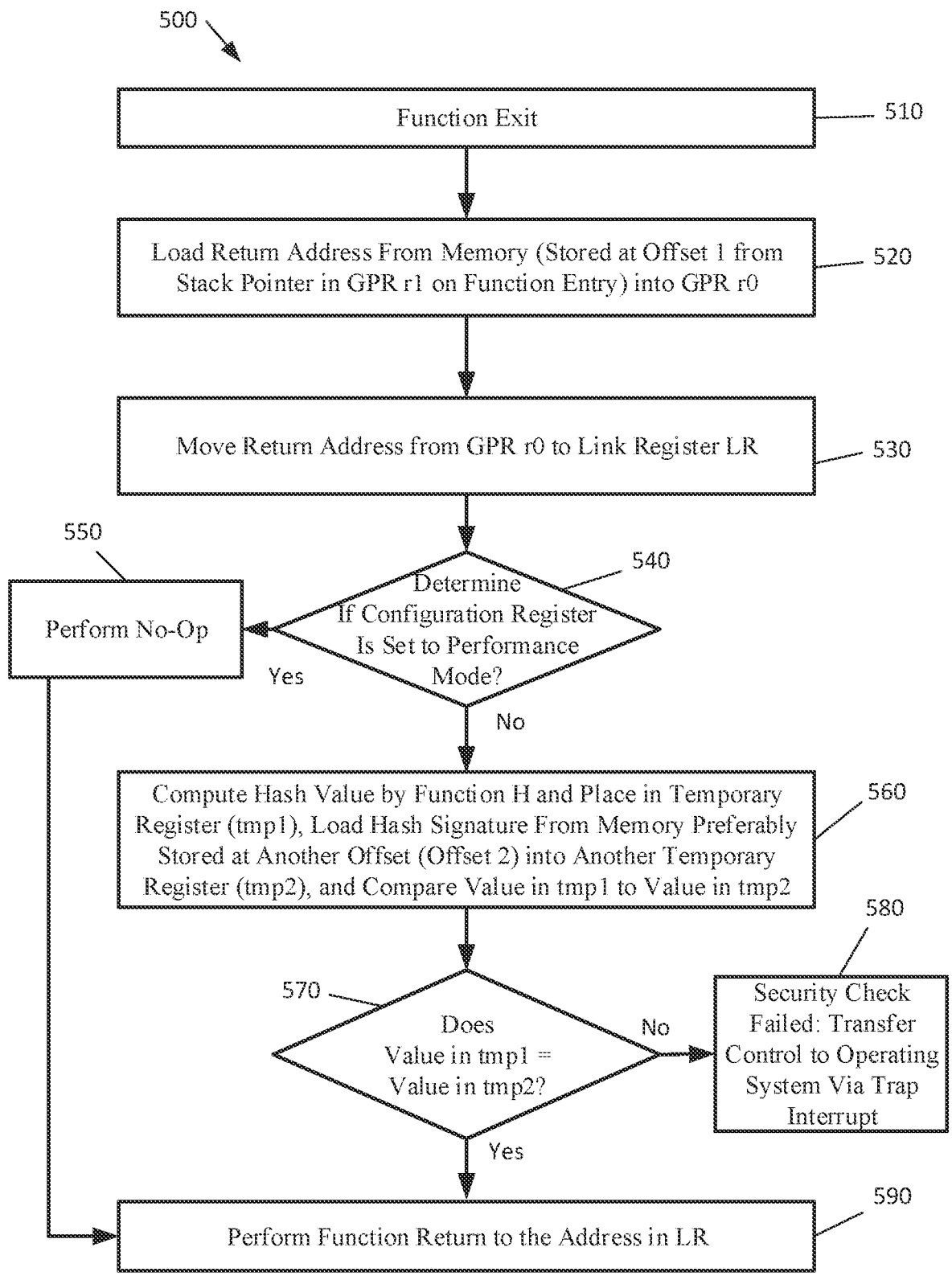
FIG. 5 depicts a flow chart of a method, according to an embodiment, of controlling a secure mode of operation of a processor while running a software program/application on a processor.

FIG. 5 illustrates an embodiment of a method 500 of undergoing a process of handling information, and in an embodiment a method to control whether a processor operates in a secure mode or a performance mode, including in the secure mode executing a security mechanism to make a processor more resistant to attack while running a software application. The method 500 more specifically is directed to controlling a security mechanism where a cryptographic signature is used to make a processor more secure, particularly while operating a software application. While method 500 shown in FIG. 5 is described for the sake of convenience and not with an intent of limiting the disclosure as comprising a series of steps and/or number of steps, it is to be understood that the process does not need to be performed as a series of steps and/or the steps do not need to be performed in the order shown and described with respect to FIG. 5, but the process may be integrated and/or one of more steps may be performed together, simultaneously, or the steps may be performed in the order disclosed or in an alternative order, unless indicated otherwise.

The method 500 of controlling the operation mode of a processor while executing a software application between a more secure mode or a more performance mode (e.g., in a more secure mode the processor is more resistant to attempts to control program flow and/or obtain unauthorized data access), includes at 510 encountering a function exit (e.g., a function return) instruction after the function has been completed, while for example running a software application. In an example, during processing a function, the function completes, and the function proceeds to exit or return (also referred to as function epilogue). At 520, upon or prior to exiting the function, e.g., upon function return, the return address from memory (e.g. the value stored at Offset 1 from the stack pointer in GPR r1, as described with reference to FIG. 4 at 430) is loaded into GPR r0. In an aspect, at 520, the return address from memory is restored. At 530 the return address from GPR r0 is moved to the link register (LR).

At 540, the control register is checked and it is determined whether the control register is set to secure mode or performance mode. In one or more embodiments, to determine whether the processor is configured in a secure mode or a performance mode, a control register (e.g., a configuration register) is checked, and in a particular embodiment a bit field in the control register is checked. In one or more aspects, the determining step 540 is not performed at this particular juncture as the mode of operation may be checked at other times, including for example upon function call-up, and the processor continues operating in that mode until function return, another function call up, or a different time or triggering event.

In response to the processor being set to performance mode (540: Yes), method 500 proceeds to 550 where a no-op (no operation or "nop") is performed and/or sent down the pipeline and the method 500 proceeds to 590 where the function return instruction is executed. If at 540 the control register is set to a secure mode, e.g., the processor is not set to performance mode (540: No), then the method proceeds to 560.

At 560, the processor computes a hash (e.g., signature 2) using a hash function H; loads the hash signature (signature 1) previously stored to memory; and compares the two hash values, e.g., signature 1 and signature 2) to see if the signatures match. In this regard the hash is recomputed at 560 in the same manner and using the values in the same registers that were used to compute the hash upon entering the function (e.g., the same manner the hash was computed at 450). The hash function H is the same hash function H used to compute the hash on function entry. The result or output of the hash computation in an embodiment is produced in a first temporary register 1 (tmp1), and is the same number of bits as used to compute the hash upon function entry. The three inputs or parameters for the hash computation in an embodiment are values in GPR r0, GPR r1, and the special purpose register (SPR), e.g., from "HASH-KEYR". The output to the first temporary register (tmp1) can in a specific preferred embodiment be represented by tmp1=H(GPR r0, GPR r1, HASHKEYR). The processor at 560 also loads the hash signature from memory into another (second) temporary register (tmp2). In an example, the value stored at offset 2 from stackpointer in GPR r1 upon function entry, described at 450, is loaded into second temporary register (tmp2). At 560, it is also determined whether the value in the first temporary register (tmp1) is the same as the value in the second temporary register (tmp2) (does the hash signature upon function entry equal the hash signature upon function exit?). In other words, at 560 the recomputed hash value (signature 2) is compared against the hash value (signature 1) restored from memory. In operation, a single instruction, e.g., "hashchk" is inserted to the code and at 560 upon encountering the "hashchk" instruction, and in response to the processor being set to a secure mode, the processor executes the three micro-operations of re-computing the hash, loading the hash from memory, and comparing the hash values. In a further aspect, the single instruction "hashchk" is cracked into three separate instructions that include generating the hash ("hashgen" instruction), loading the hash value from memory ("ld" instruction), and comparing the hash values ("cmp" instruction).

At 570 if the hash signature values are the same (tmp1=tmp2) (570: Yes), then the process 500 proceeds to 590 and the security check passed. At 590, the function return or exit is performed to return to the address in the link register. If at 570, the hash value in the second temporary register (tmp2) does not equal the recomputed hash value in the first temporary register (tmp1) (570: No), then the process continues to 580 where the security check failed. In an embodiment, at 580 control is transferred to the operating system (OS) via a trap interrupt. It can be appreciated that the trap interrupt feature (instruction set) can be part of or incorporated into the "hashchk" instruction. That is, the single instruction, "hashchk" can include instructions to perform the trap interrupt if the hash values (signature 1 and signature 2) do not match. The trap interrupt can include a number of options including but not limited to transferring control to the operating system (O/S), exiting the software application without performing the return function instruction, or other operations that do not return operations to the location specified by the stack pointer.

An example of instructions inserted into the code, preferably by the compiler, to compute a hash upon function call-up (function entry) is described with reference to FIG. 6, where a new instruction "hashst" supported in a processor is inserted into a software program/application. FIG. 6 illustrates the instructions encountered by and the operations executed by the processor, in response to the processor being set in a secure mode, where a cryptographic hash is computed at function call-up and stored into memory. In FIG. 6, instruction numbers 0 & 1 perform the function of saving the value from link register. More specifically, instruction 0, a move-from-link-register (mflr) instruction, moves the value from the link register into general purpose register (GPR) r0, and instruction 1 stores the value from the link register to a memory location at an offset 1 from the stack pointer in GPR r1. At instruction 2, in secure mode, the "hashst" instruction is executed to compute the hash and store the hash value to a memory location at an offset 2 from the stack pointer in GPR r1. In a preferred embodiment the hash is computed using three inputs, including the value in GPR r0, the value in GPR 1, and a secret key (preferably accessible from a special purpose register with a higher privilege level than the hashgen instruction), and outputs (returns) the hash computation to a temporary register (tmp), although other hash computations with different parameters are contemplated. Instruction 2 ("hashst") also stores the hash output to the temporary register (tmp) to a memory location, preferably at an offset 2 to the stack pointer in GPR r1. Instruction 3 saves the hash value to GPR 31 at an offset 3 from the stack pointer in GPR r1.

An example of instructions inserted into the code, preferably by the compiler, to check a cryptographic hash signature upon function return (function exit) is described with reference to FIG. 7, where a new instruction "hashchk" supported in a processor is inserted into a software program/application. FIG. 7 illustrates the instructions encountered by and the operations performed (executed) by the processor, in response to the processor being set in a secure mode and encountering a function exit/return instruction, where a cryptographic hash is checked at function return. In FIG. 7, instruction 0 loads (restores) the return address from memory (e.g., stored at offset 1 from stack pointer in GPR r1 that was stored during function entry micro-operations at, for example, instruction 1 in FIG. 6), to GPR r0. At instruction 1, the return address from GPR r0 is moved to the link register.

At instruction 2 in FIG. 7, the "hashchk" instruction is executed to compute a second hash (signature 2) using the same hash function and the same parameters as used to compute the first hash that was computed upon function call-up (function entry). The hash is recomputed using three inputs, including the value in GPR r0, the value in GPR 1, and the secret key (preferably accessible from a special purpose register with a higher privilege level than the "hashchk" instruction), and outputs (returns) the second hash computation (signature 2) to a first temporary register (tmp1). Instruction 2, the "hashchk" instruction also loads the hash signature (signature 1) from memory, stored at a second offset from the stack pointer in r1, into another (second) temporary register (tmp2), and the "hashchk" instruction compares the value in tmp1 to the value in temp 2 to determine if the values match (i.e., whether the signatures match, signature 1=signature 2). If the signatures do not match (tmp1 not=tmp2), then the "hashchk", if included, performs an optional trap interrupt where control is transferred to the operating system and the function return instruction is not executed. If the signatures do match (tmp1=tmp2), then the process continues to instruction 3 where the function return executes to return to the address in the link register.

FIG. 8 illustrates the operations performed by the processor, in response to the processor being set in a performance mode (e.g., where the bit field or bit in the control register is set to the performance mode), when the processor encounters the instructions of FIG. 6 inserted into a software application. In FIG. 8, instruction numbers 0 & 1 perform the function of saving the value from link register. More specifically, instruction 0, a move-from-link-register (mflr) instruction, moves the value from the link register into general purpose register (GPR) r0, and instruction 1 stores the value from the link register to a memory location at an offset 1 from the stack pointer in GPR r1. At instruction 2, in performance mode, the "hashst" instruction is executed as a no-operation or "nop". That is the hashst instruction in performance mode is ignored and/or skipped, and the hash signature is not computed or stored to a memory location. Instruction 3 executes and saves the hash value to GPR 31 at an offset 3 from the stack pointer in GPR r1.

FIG. 9 illustrates the operations performed by the processor, in response to the processor being set in a performance mode, when the processor encounters the instructions of FIG. 7 inserted into a software application. In FIG. 9, instruction 0 loads (restores) the return address from memory (e.g., stored at offset 1 from stack pointer in GPR r1 that was stored during function entry micro-operations), to GPR r0. At instruction 1, the return address from GPR r0 is moved to the link register. At instruction 2, the "hashchk" instruction is executed as a no-operation, referred to as a "nop". In this regard, when operating in the performance mode, the processor ignores and/or skips the "hashchk" instruction and proceeds to instruction 3. In this regard, the hash (signature 2) is not recomputed, the earlier hash signature (signature 1) is not loaded from memory, and no comparison is performed between the signatures (e.g., no comparison of the value in tmp1 to the value in tmp2) to determine if the values match, and no optional trap interrupt is performed where control is transferred to the operating system if the values do not match. Instead, the process continues to instruction 4 where the function return executes to return to the address in the link register.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of handling data in a processor, the method comprising:
    insert, in response to a function callup, a secure mode entry instruction and a secure mode exit instruction into software application code;
    operating a processor, in response to a value set in a bit field of a control register, in either a secure mode or a performance mode, wherein the control register is only settable in a privilege level higher than a privilege level required for computing an entry hash value and an exit hash value,
    wherein in the secure mode, the processor upon encountering the secure mode entry instruction, computes the entry hash value using a hash function and one or more hash input parameters, and stores the entry hash value in a first memory location;
    wherein in the secure mode, the processor upon encountering the secure mode exit instruction, computes the exit hash value using the same hash function used when computing the entry hash value, loads the entry hash value from the first memory location, and validates whether the entry hash value is the same as the exit hash value before permitting the function callup to be completed; and
    wherein in the performance mode, the processor upon encountering the secure mode entry instruction, executes the secure mode entry instruction as a no-operation and upon encountering the secure mode exit instruction, the processor executes the secure mode exit instruction as a no-operation.

2. The method according to claim 1, wherein the secure mode entry instruction is a single instruction that the processor, in response to operating in the secure mode, cracks into multiple instructions that compute the entry hash value and store the entry hash value.

3. The method according to claim 1, wherein the secure mode entry instruction is a single instruction that the processor, in response to operating in the performance mode, sends a no-op down an execution pipeline in the processor in place of the single secure mode entry instruction.

4. The method according to claim 1, wherein the secure mode entry instruction is a single instruction that the processor, in response to operating in the performance mode, performs at least one of the group consisting of: interprets as a no-operation; sends a no-operation instruction down the pipeline in place of the single secure mode entry instruction; skips over the single secure mode entry instructions, and combinations thereof.

5. The method according to claim 1, further comprising, prior to computing the entry hash value in both the secure mode and the performance mode:
copying a value provided by a link register into a second general purpose register entry; and
storing the value from the second general purpose register entry to a second memory location.

6. The method according to claim 5, wherein computing the entry hash value uses three hash input parameters, the three hash input parameters include a first hash input parameter that is a first value in a first general purpose register entry, a second hash input parameter that is a second value in a second general purpose register entry, and a third hash input parameter that is a secret key.

7. The method according to claim 6, wherein the secret key is stored in a special purpose register, and the special purpose register is accessible only in a privilege level higher than the privilege level computing the entry hash value.

8. The method according to claim 1, further comprising: the processor, in response to operating in the secure mode and encountering the secure mode exit instruction, executing, in response to the entry hash value not being equal to the exit hash value, a trap interrupt.

9. The method according to claim 8, wherein the trap interrupt transfers control to an Operating System.

10. The method according to claim 1, wherein the secure mode exit instruction is a single instruction that the processor, in response to operating in the secure mode, cracks into multiple instructions that computes the exit hash value, loads the entry hash value, and determines whether the exit hash value is the same as the exit hash value.

11. The method according to claim 1, wherein the secure mode exit instruction is a single instruction that the processor, in response to operating in the performance mode, performs at least one of the group consisting of:
interprets as a no-operation;
sends a no-operation instruction down the pipeline in place of the single secure mode exit instruction;
skips over the single secure mode exit instruction, and combinations thereof.

12. A system for executing instructions in a software application, the system comprising:
a processor having circuitry and logic for executing the instructions, the processor comprising:
a decode unit comprising circuitry and logic for decoding the instructions, the decode unit having a control register;
an issue unit comprising circuitry and logic for receiving the decoded instructions and issuing decoded instructions, an execution unit comprising circuitry and logic for executing decoded instructions issued by the issue unit;
and a non-transitory computer-readable medium having program instructions embodied therewith, the program instructions executable by the processor to cause the processor to:
insert, in response to a function call-up, a secure mode entry instruction into software application code;
insert, in response to a function return, a secure mode exit instruction into the software application code; and
operate, in response to a value set in a bit field of the control register, in either a secure mode or a performance mode, wherein the control register is only settable in a privilege level higher than a privilege level required for computing an entry hash value and an exit hash value;
wherein in the secure mode, the processor:
upon encountering the secure mode entry instruction, computes the entry hash value using a hash function and stores the entry hash value in a first memory location; and
upon encountering the secure mode exit instruction, computes the exit hash value using the same hash function used when computing the entry hash value, loads the entry hash value from the first memory location, and validates determines whether the entry hash value is the same as the exit hash value before permitting the function callup to be completed, and
wherein in the performance mode, the processor:
upon encountering the secure mode entry instruction, executes the secure mode entry instruction as a no-operation; and upon encountering the secure mode exit instruction, executes the secure mode exit instruction as a no-operation.

13. The system according to claim 12, wherein the secure mode entry instruction is a single instruction and the secure mode exit instruction is a single instruction, the system further comprising programming instructions executable by the processor to cause the processor to:
crack the single secure mode entry instruction, in response to operating in the secure mode, into multiple instructions that compute the entry hash value and store the entry hash value; and
crack the single secure mode exit instruction, in response to operating in the secure mode, into multiple instructions that compute the exit hash value, load the entry hash value from memory, and determines whether the entry hash value is the same as the exit hash value.

14. The system according to claim 12, wherein computing the entry hash includes three hash parameter inputs include a first hash input parameter that is the value in the first general purpose register entry, a second hash input parameter that is the value in the second general purpose register entry, and a third hash input parameter that is a secret key.

15. The system according to claim 14, wherein the special purpose register storing the secret key is accessible only in a privilege level higher than the privilege level computing the entry hash value.

16. The system according to claim 12, further comprising programming instructions executable by the processor to cause the processor to:
in response to the entry hash value being equal to the exit hash value, perform the function return wherein the processor will exit the function; and
in response to the entry hash value not being equal to the exit hash value, execute a trap interrupt that causes control to transfer to an Operating System and not perform the function return.

\* \* \* \* \*